Sept. 4, 1934.  E. C. KRADOSKA  1,972,779
FLEXIBLE COUPLING
Filed May 2, 1932
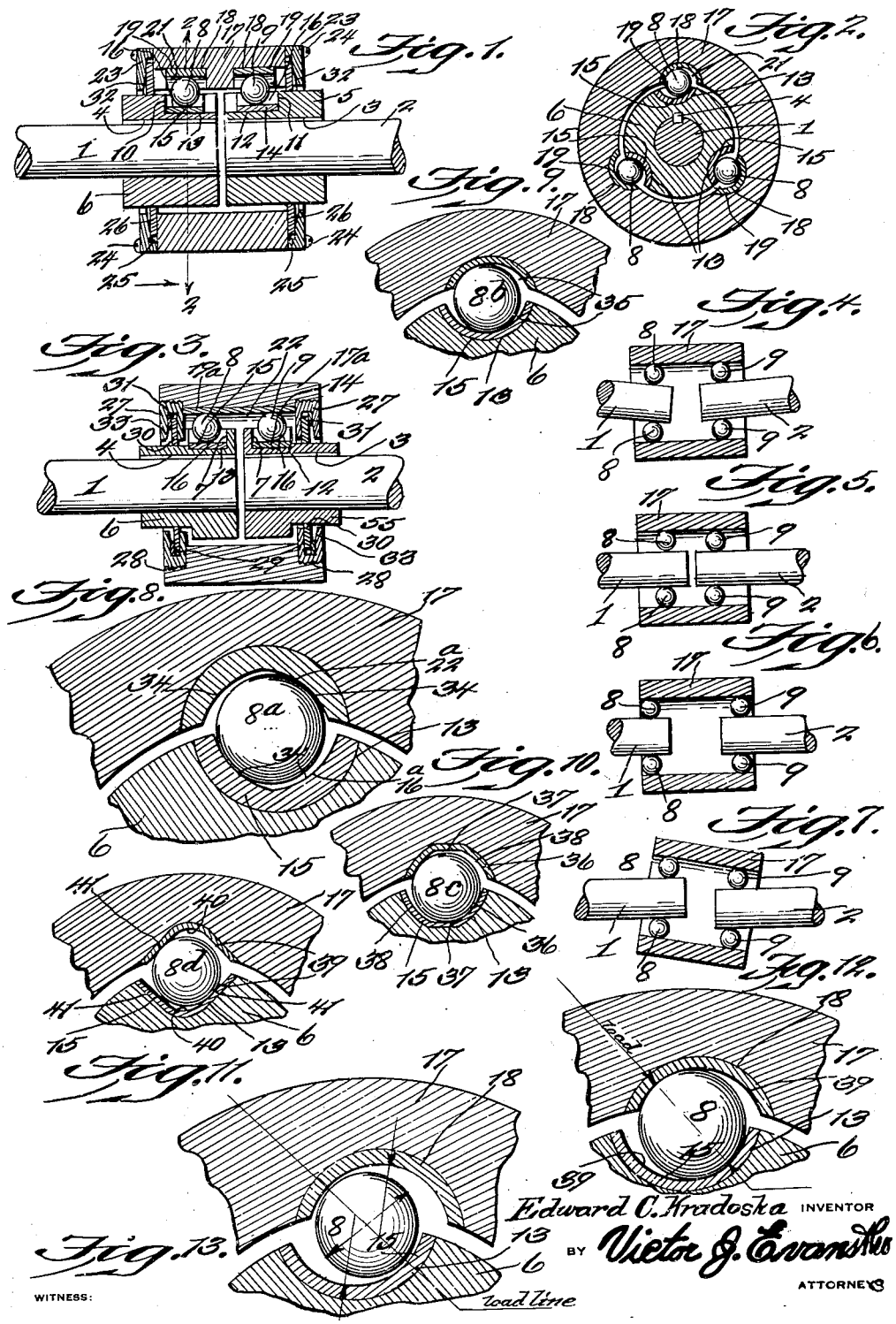
Edward C. Kradoska INVENTOR
BY Victor J. Evans
ATTORNEYS Patented Sept. 4, 1934

1,972,779

UNITED STATES PATENT OFFICE 1,972,779

FLEXIBLE COUPLING

Edward C. Kradoska, Philadelphia, Pa., assignor to George J. Keller, Glenside, Pa.

Application May 2, 1932, Serial No. 608,779

8 Claims. (Cl. 64—91)

This invention relates to an improved flexible coupling particularly adapted for power transmission between driving and driven shafts, or between two shaft sections, and the purpose of the invention is to provide a coupling of such character as to enable power to be transmitted from one section to another whether the adjacent ends of the shaft sections are close together or substantially widely separated, or whether the shaft sections are in parallel misalignment or angular mis-alignment.

Another purpose is to provide a flexible coupling including spherical members operative in cylindrical pockets, the latter being of greater radii than the spherical members, so that the members can readily roll in the seats of the cylindrical pockets and more easily take up the load from one section to the other without undue torsional strain on the moving parts.

Another purpose is to provide a coupling of this character, wherein the cylindrical pockets are of such elongated form as to enable the shaft sections to float or move axially toward and from each other as the load is equalized between the two sections.

A further purpose is to provide a coupling of this kind including means for retaining the spherical members in their pockets, together with means for preventing loss of lubrication to be contained in the coupling.

By the provision of a coupling of this kind including cylindrical pockets for the spherical members, the pockets have radii substantially greater than the spherical members and insure rolling action of the members, such as will prevent flats on the members.

A still further purpose is to provide, in a coupling of this kind elongated pockets for the spherical members having multiple curvatures of greater radii than the spherical members, or multiple seats, with each one of which the spherical members may have single point of contact, in order to insure a rolling action in the picking up of and equalizing the load between the shaft sections, thereby avoiding any undue torsional strain between the rotating shaft sections.

It is to be understood that the particulars herein given are in no way limitative, and that while still keeping within the scope of the inven50 tion, any desired modification of details and proportions may be made in the construction of the appliance according to circumstances.

The invention comprises further features and combination of parts to be hereinafter set forth, shown in the drawing and claimed.

In the drawing:—

Figure 1 is a longitudinal sectional view through the improved coupling constructed in accordance with the invention.

Figure 2 is a sectional view on line 2—2 of Figure 1.

Figure 3 is a longitudinal sectional view slightly modified to that shown in Figure 1.

Figures 4 to 7 inclusive show diagrams illustrating the various axial floating mis-alignment positions of the shaft sections.

Figure 8 is a fragmentary view wherein the pockets have multiple curvatures of greater radii than the spherical member.

Figure 9 is a fragmentary view of the coupling in transverse cross section, each pocket having three radii, or of a parabolical curvature.

Figures 10 and 11 inclusive show fragmentary portions of the coupling in transverse cross section, wherein the seats of the pockets have multiple points of contact with the spherical members.

Figures 12 and 13 are fragmentary views of parts of the coupling in transverse cross section illustrating different positions of the pockets relative to the spherical members.

Referring to the drawing 1 and 2 identify shaft sections, in the present instance the latter being the driving section and the former the driven section, though it may be just the reverse.

Keyed at 3 and 4 on the adjacent ends of the shaft sections are heads 5 and 6, those in Figure 3 being slightly modified to those in Figure 1, in that the abutting shoulders 7 are in between the spherical members 8 and 9, whereas in Figure 1 the abutment shoulders 10 and 11 are adjacent remote sides of the spherical members 8 and 9.

Arranged in cavities 12 and 13 of the heads 5 and 6 are bushings 14 and 15, which have seats 16 for the spherical members 9 and 8. These seats 16 are of greater radii than the spherical members 8 and 9, so that the spherical members can roll in the load being taken up and equalized between the shaft sections, thereby relieving any torsional strain on the rotating parts.

Surrounding the heads 5 and 6, which are carried by the shaft sections is a sleeve or collar 17, which in Figure 1 is provided with cavities 18 for the reception of bushings 19. Judging from the construction and arrangement in Figure 1 there are 6 bushings 19, but upon examining the construction and arrangement shown in Figure 3 the sleeve or collar 17a only has three cavities for the reception of three bushings 19a. It is to be noted that the bushings 19a in Figure 3 are more elongated than those in Figure 1, because the abutment shoulders 7 are between the spherical members, whereas the abutment shoulders 10 and 11 in Figure 1 are on the remote sides of the spherical members.

The bushings 19 and 19a in Figures 1 and 3 have seats 21 and 22 for the reception of the spherical members 8 and 9.

It will be noted that the seat 16 and the seats 21 and 22 are of greater radii than the spherical members 8 and 9, allowing the members to roll as the load takes up and equalizes between the shaft sections, which relieves to a great extent any torsional strain between the rotating parts, and which at the same time prevents flats forming on the spherical members.

In Figure 1 covers 23 are fastened by screws 24 or the like to the ends of the sleeve or collar 17, and these covers have recesses 25 for the reception of non-metallic washers 26, which may be constructed of any suitable material preferably fibrous material, which may be not too stiff and not too pliable, but of a character as to remain in wiping contact with the outer cylindrical surfaces of the heads 5 and 6, thereby providing for the retention of lubrication within the collar or sleeve 17, and also to exclude dust, dirt and other foreign matter from the interior of the sleeve or collar.

In Figure 3 plates 27 are threaded at 28 into the opposite ends of the collar or sleeve 17a, and are channeled at 29, the channels receiving non-metallic washers 30 similar to the washers 26 and designed for the same purpose. However in Figure 3 retaining rings 31 are also located in the channels 29 to engage with the washers 30 to insure holding certain portions of the washers in fixed positions.

As shown in Figure 1 and in Figure 3 certain portions of the walls of the recesses 25 and certain walls of the channels 29 are inclined at 32 and 33 to allow certain parts of the washers 26 and 30 to flex during the axial movement of the shaft sections as well as permitting of mis-alignment positions of the shaft sections, either parallel mis-alignment positions or angular mis-alignment positions.

Referring to Figure 8 the seat 16a and the seat 22a have multiple curvatures 34, of greater radii than the spherical member 8a, which construction also permits of rolling action of the spherical member when taking up and equalizing the load between the shaft sections and which also relieves to a substantial extent any torsional strain on the rotating parts.

In Figure 9 the seats 35 of the bushings have 3 curvatures, certain of which are of greater radii than the spherical member 8b. In Figure 10 the seats 36 of the bushings at diametrical opposite portions have flats 37 and curvatures 38, which are of greater radii than the spherical member 8c.

In Figure 11 the seats 39 of the bushings at diametrical opposite portions have curvatures 40 of less radii than the spherical member 8d, while these same seats 39 have diagonal opposite flats 41, thereby providing seats for the spherical member having a multiple of contacts with the spherical member.

The invention having been set forth, what is claimed is:

1. In a flexible coupling, the combination with adjacent ends of a pair of shaft sections, of heads fast on the adjacent ends of the shaft sections, a sleeve encircling the adjacent heads in spaced relation thereto, the exterior of the heads and the interior of the sleeve having cavities, bushings arranged in the cavities and provided with cylindrical seats, spherical members engaged in said seats and being of less radii than the radii of the cylindrical seats, thereby allowing the spherical members to roll when taking up and equalizing the load while the shaft sections are parallel or angularly mis-aligned, said seats extending in directions longitudinal with the shaft sections, thereby allowing axial movement as well as a tilting movement relative to the other adjacent shaft section.

2. In a flexible coupling, the combination with adjacent ends of a pair of shaft sections, of heads fast on the adjacent ends of the shaft sections, a sleeve encircling the adjacent heads in spaced relation thereto, the exterior of the heads and the interior of the sleeve having cavities, bushings arranged in the cavities and provided with cylindrical seats, spherical members engaged in said seats and being of less radii than the radii of the cylindrical seats, thereby allowing the spherical members to roll when taking up and equalizing the load while the shaft sections are parallel or angularly mis-aligned, said seats extending in directions longitudinal with the shaft sections, thereby allowing axial movement as well as a tilting movement relative to the other adjacent shaft section, abutments at certain opposite ends of the cylindrical seats for retaining the spherical members in the seats and preventing excessive longitudinal movements of the members.

3. In a flexible coupling, the combination with adjacent ends of a pair of shaft sections, of heads fast on the adjacent ends of the shaft sections, a sleeve encircling the adjacent heads in spaced relation thereto, the exterior of the heads and the interior of the sleeve having cavities, bushings arranged in the cavities and provided with cylindrical seats, spherical members engaged in said seats and being of less radii than the radii of the cylindrical seats, thereby allowing the spherical members to roll when taking up and equalizing the load while the shaft sections are parallel and angularly mis-aligned, said seats extending in directions longitudinal with the shaft sections, thereby allowing axial movement as well as a tilting movement relative to the other adjacent shaft section, abutments at certain opposite ends of the cylindrical seats for retaining the spherical members in the seats and preventing excessive longitudinal movements of the members, certain of the abutments including means for the retention of lubricant within the sleeve.

4. In a flexible coupling, a pair of shaft sections substantially end to end, a head fast on the end of each shaft section, a sleeve encircling the adjacent heads in spaced relation thereto, at triangular positions exteriorly of the heads and interiorly of the sleeve being provided with bushed cylindrical cavities with cylindrical seats in said bushings, spherical members engaged in the seats, said spherical members being of a less radii than the seats to permit rolling action of the spherical members when taking up and equalizing the load, which together with the cylindrical seats being parallel with the shaft sections constitute means to allow end to end movement of the shaft sections as well as parallel and angularly mis-alignment of the shaft sections.

5. In a flexible coupling, a pair of shaft sections substantially end to end, a head fast on the end of each shaft section, a sleeve encircling the adjacent heads in spaced relation thereto, at triangular positions exteriorly of the heads and interiorly of the sleeve being provided with bushed cylindrical cavities with cylindrical seats in said bushings, spherical members engaged in the seats, said spherical members being of a less radii than the seats to permit rolling action of the spherical members when taking up and equalizing the load, which together with the cylindrical seats being parallel with the shaft sections constitute means to allow end to end movement of the shaft sections as well as parallel and angularly mis-alignment of the shaft sections, and means operatively associated with the heads and the sleeve to prevent excessive longitudinal movement of the aforesaid associated elements.

6. A flexible shaft coupling comprising a sleeve, two hubs disposed end to end and each having a sleeve, said hubs and the first sleeve provided with longitudinally elongated pockets or cavities in spaced relation at three different points, spherical intermediate members in said pockets, said pockets having specially formed contacting surfaces with a relative curvature greater than the spherical intermediate members contacted by the walls of said pockets, said contact under driving load producing a true compressive load upon the spherical members.

7. A flexible shaft coupling comprising a sleeve, two hubs disposed end to end and each having a sleeve, said hubs and the first sleeve provided with longitudinally elongated pockets or cavities in spaced relation at three different points, spherical intermediate members in said pockets, said pockets having specially formed contacting surfaces with a relative curvature greater than the spherical intermediate members contacted by the walls of said pockets, said contact under driving load producing a true compressive load upon the spherical members, said contact at said three different points between the first sleeve and each hub producing equal distribution of load to the spherical members during operation under aligned, misaligned, and axial motion conditions, separately or in combination.

8. A flexible shaft coupling comprising a sleeve, two hubs disposed end to end and each having a sleeve, said hubs and the first sleeve provided with longitudinally elongated pockets or cavities in spaced relation at three different points, spherical intermediate members in said pockets, said pockets having specially formed contacting surfaces with a relative curvature greater than the spherical intermediate members contacted by the walls of said pockets, said contact under driving load producing a true compressive load upon the spherical members, said contact at said three different points between the first sleeve and each hub producing equal distribution of load to the spherical members during operation under aligned, misaligned, and axial motion conditions, separately or in combination, said equal distribution of load constituting means insuring that any required motion necessary between said hubs and the first sleeve during operation under conditions of misalignment or axial motion will be accomplished by true rolling motion of the spherical members.

EDWARD C. KRADOSKA.